(12) United States Patent
Rajput et al.

(10) Patent No.: US 8,819,012 B2
(45) Date of Patent: Aug. 26, 2014

(54) ACCESSING ANCHORS IN VOICE SITE CONTENT

(75) Inventors: Nitendra Rajput, New Delhi (IN); Kundan Shrivastava, Faridabad (IN)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 13/220,967

(22) Filed: Aug. 30, 2011

(65) Prior Publication Data
US 2013/0054609 A1 Feb. 28, 2013

(51) Int. Cl.
*G06F 17/30* (2006.01)

(52) U.S. Cl.
USPC ............................ 707/736; 707/741; 707/770

(58) Field of Classification Search
USPC .................. 707/736, 770, 999.104, 999.2
See application file for complete search history.

(56) References Cited

U.S. PATENT DOCUMENTS

| | | | |
|---|---|---|---|
| 6,327,343 B1 * | 12/2001 | Epstein et al. | 379/88.01 |
| 6,345,252 B1 * | 2/2002 | Beigi et al. | 704/272 |
| 6,704,708 B1 * | 3/2004 | Pickering | 704/235 |
| 6,738,803 B1 * | 5/2004 | Dodrill et al. | 709/218 |
| 6,877,001 B2 | 4/2005 | Wolf et al. | |
| 7,027,987 B1 | 4/2006 | Franz et al. | |
| 7,142,554 B1 * | 11/2006 | Isukapalli et al. | 370/428 |
| 7,313,525 B1 | 12/2007 | Packingham et al. | |
| 7,379,973 B2 * | 5/2008 | Berkowitz et al. | 709/217 |
| 7,809,568 B2 * | 10/2010 | Acero et al. | 704/257 |
| 7,933,389 B2 * | 4/2011 | Kumar et al. | 379/68 |
| 7,983,915 B2 * | 7/2011 | Knight et al. | 704/254 |
| 8,046,220 B2 * | 10/2011 | Agarwal et al. | 704/235 |
| 8,275,099 B2 * | 9/2012 | Agarwal et al. | 379/88.17 |
| 8,311,823 B2 * | 11/2012 | Bloebaum et al. | 704/235 |
| 2001/0056479 A1 | 12/2001 | Miyayama et al. | |
| 2002/0010916 A1 * | 1/2002 | Thong et al. | 725/1 |
| 2007/0033229 A1 * | 2/2007 | Fassett et al. | 707/104.1 |
| 2007/0211869 A1 * | 9/2007 | Kiiskinen | 379/101.01 |
| 2008/0005071 A1 | 1/2008 | Flake et al. | |
| 2008/0065695 A1 * | 3/2008 | Adstedt et al. | 707/104.1 |
| 2008/0235283 A1 * | 9/2008 | Turnball et al. | 707/104.1 |
| 2008/0270110 A1 * | 10/2008 | Yurick et al. | 704/3 |
| 2008/0270138 A1 * | 10/2008 | Knight et al. | 704/260 |
| 2008/0270344 A1 * | 10/2008 | Yurick et al. | 707/2 |
| 2009/0119250 A1 | 5/2009 | Reed | |
| 2009/0138262 A1 | 5/2009 | Agarwal et al. | |
| 2009/0238348 A1 | 9/2009 | Agarwal et al. | |

(Continued)

OTHER PUBLICATIONS

Agarwal et al., The Spoken Web: A Web for the Underprivileged, SIGWEB Newsletter Summer 2010, pp. 1-9.

(Continued)

*Primary Examiner* — Noosha Arjomandi
(74) *Attorney, Agent, or Firm* — Ryan, Mason & Lewis, LLP

(57) ABSTRACT

A method, an apparatus and an article of manufacture for accessing a specific location in voice site audio content. The method includes indexing, in a voice site index, a specific location in the voice site that contains the audio content, mapping the audio content with information regarding the location and adding the mapped content to the index of the voice site, using the index to determine content and location of an input query in the voice site, automatically marking the specific location in the voice site that contains the determined content and location of the input query, and automatically transferring to the marked location in the voice site.

16 Claims, 4 Drawing Sheets

(56) References Cited

U.S. PATENT DOCUMENTS

| | | | |
|---|---|---|---|
| 2010/0158214 A1* | 6/2010 | Gravino et al. | 379/88.14 |
| 2011/0010627 A1* | 1/2011 | Donaldson et al. | 715/727 |
| 2011/0054647 A1* | 3/2011 | Chipchase et al. | 700/94 |
| 2011/0225153 A1* | 9/2011 | Haseyama | 707/736 |
| 2012/0030236 A1* | 2/2012 | Burton, Jr. | 707/770 |
| 2012/0136870 A1* | 5/2012 | Joshi et al. | 707/741 |
| 2012/0214544 A1* | 8/2012 | Shivappa et al. | 455/556.1 |
| 2012/0310642 A1* | 12/2012 | Cao et al. | 704/235 |
| 2013/0054250 A1* | 2/2013 | Nanavati et al. | 704/276 |

OTHER PUBLICATIONS

IBM's Spoken Web, Mar. 5, 2011, techtimely in Technews. p. 5-6. http://techtimely.wordpress.com/2011/03/05/ibms-spoken-web/.

Prakrash, Creating Voice Sites Using the Telephone, http://www.expresscomputeronline.com/20091019/technology01.shtml, downloaded Mar. 11, 2011, pp. 1-4.

Sharma et al., Voice Facebook, http://www.cse.iitd.ernet.in/~aseth/act4d/reports/voice-facebook.pdf, downloaded Jan. 2012, pp. 1-4.

Google Voice Search. www.google.com/mobile/voice-search/ downloaded Jan. 2012, pp. 1-1.

Johnson et al., A Method for Direct Audio Search with Applications to Indexing and Retrieval, in proc. of IEEE ICASSP, 2000, pp. 1427-1430.

Kennedy et al., Automatic Discovery of Query-Class-Dependent Models for Multimodal Search, ACM International Conference on Multimedia, 2005, pp. 882-891.

* cited by examiner

ACCESSING ANCHORS IN VOICE SITE CONTENT

FIELD OF THE INVENTION

Embodiments of the invention generally relate to information technology, and, more particularly, to searching voice sites.

BACKGROUND OF THE INVENTION

The World Wide Telecom Web (WWTW) includes an increasingly large number of voice sites. Due to the unique structure of the voice sites, the search techniques from the WWW domain cannot be used in the WWTW world. Further, existing approaches do not provide adequate mechanisms to search for information and services contained or accessible through voice sites.

Accessing information on voice sites is an interactive process. Accordingly, if a search result is in not in the main page of the voice site, then in order to reach it, some user interaction is required. This presents challenges if a Spoken Web search engine is providing an interface to reach to the content.

SUMMARY OF THE INVENTION

In one aspect of the present invention, techniques for accessing anchors in voice site content are provided. An exemplary computer-implemented method for accessing a specific location in voice site audio content can include steps of indexing, in a voice site index, a specific location in the voice site that contains the audio content, mapping the audio content with information regarding the location and adding the mapped content to the index of the voice site, using the index to determine content and location of an input query in the voice site, automatically marking the specific location in the voice site that contains the determined content and location of the input query, and automatically transferring to the marked location in the voice site.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

As described herein, an aspect of the present invention includes enabling navigation directly into anchors in voice site content. As described herein, an anchor is a part of a voice site that has a specific piece of content, but cannot be accessed directly by dialing a phone number. As an example, if a voice site has three sections—farming, education and health—when a user dials this voice site, she or he can choose from these three options. Each of these three options is an anchor. Accordingly, an aspect of the invention provides a mechanism so that a user can directly reach a particular anchor. For instance, consider the example of health noted above. If he or she has searched for some health-related advice on another search voice site, navigation directly to that sub-section or to that anchor is enabled through an embodiment of the invention. Anchor access can be obtained, for example, by providing information about the voice site structure in sections of the voice site.

One or more embodiments of the invention include a mechanism to search the Telecom Web through text and/or audio prompts, structure, and audio contained in voice sites. Also, indexing and searching voice sites can be carried out from additional sources in a voice site such as expected voice-site-user response(s) through speech recognition grammars, and meta information available in the presentation layer (that is, at the voice extensible markup language (VoiceXML) level).

As described herein, the noted techniques include encapsulating user interactions required for each item of voice site content into a meta-information block for that content. This meta-information is then used to reach the content, without requiring user interaction. Further, in connection with one or more aspects of the invention, using VoiSearch (a speech-based search) can result in a higher penetration (because it can be accessed over phone) and a higher acceptance (because the users need not be computer savvy) than existing approaches.

Accordingly, an aspect of the invention includes transferring control to a specific section in a voice site by identifying the section that contains the search result in the actual voice site, as well as by providing an ability to transfer to a particular section in the voice site while meeting session requirements. Additionally, as described herein, an embodiment of the invention includes identifying, marking, and dynamically playing the marked audio that contains the search term.

Figure 1:
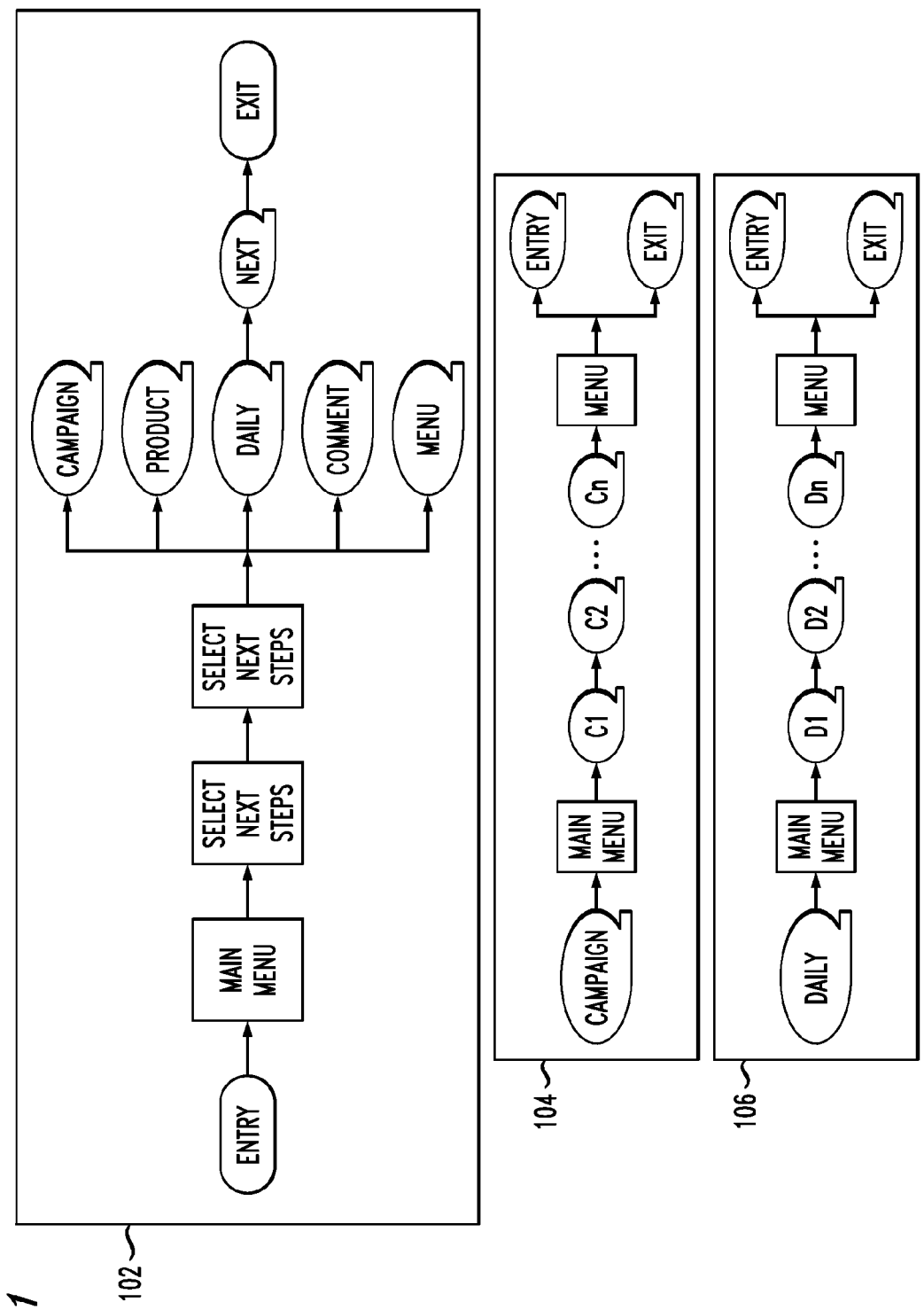
FIG. 1 is a diagram illustrating a typical voice site call flow, according to an embodiment of the invention.

FIG. 1 is a diagram illustrating a typical voice site call flow, according to an embodiment of the invention. By way of illustration, FIG. 1 depicts a main call flow sequence 102, which includes a search entry step, a main menu, selection of subsequent steps and a search exit step. FIG. 1 also depicts sub-tree portions of the call flow 104 and 106, which can stem from a selection made in the main call flow 102. As detailed herein, a desired search result can be in one of the contents of the sub-tree portions of the flow.

Figure 2:
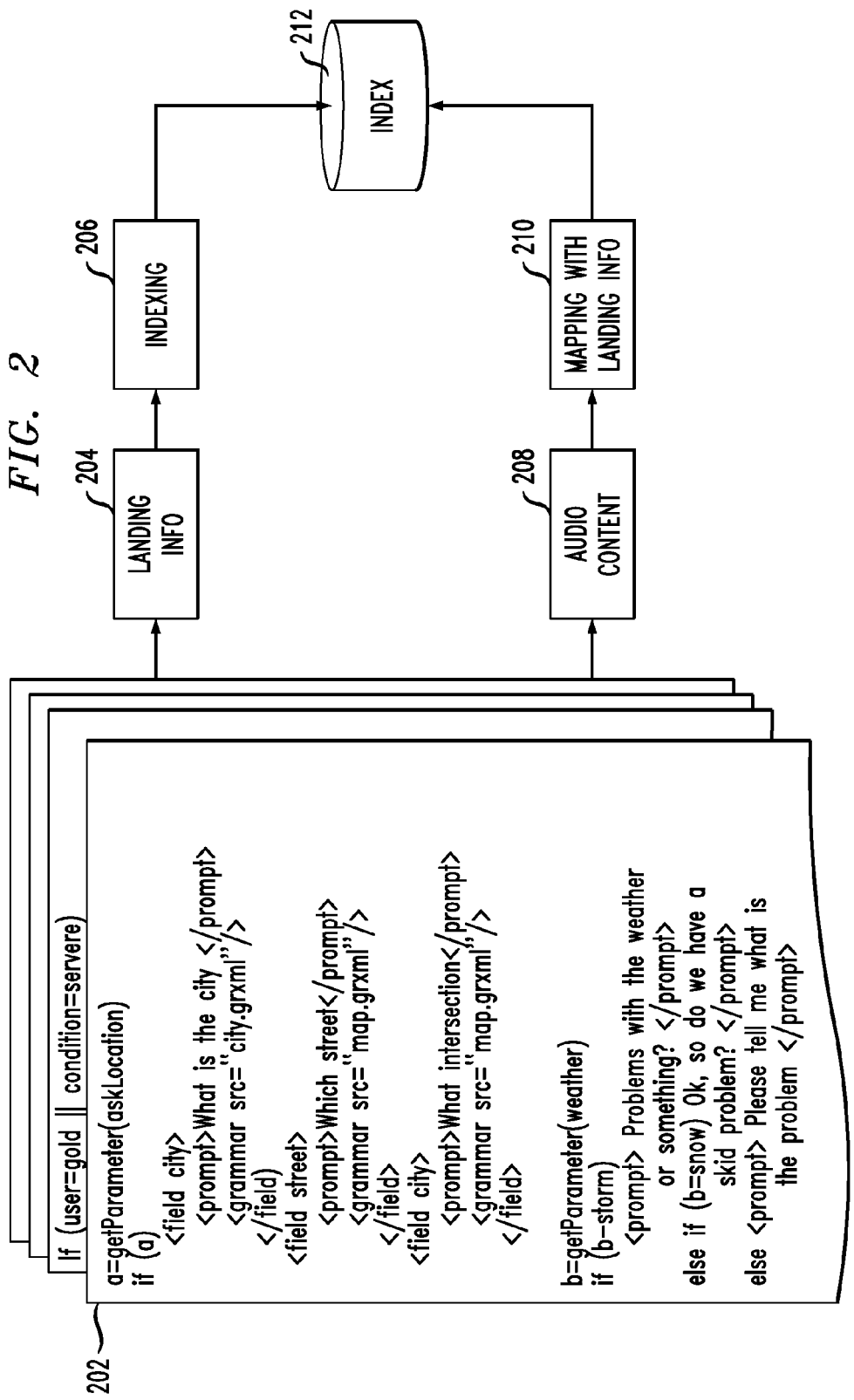
FIG. 2 is a block diagram illustrating indexing, according to an aspect of the invention.

FIG. 2 is a diagram illustrating indexing, according to an aspect of the invention. By way of illustration, FIG. 2 depicts voice sites 202 in different representations such as VoiceXML, SALT, etc. Input from the voice sites 202 is provided to a landing information module 204, which then provides input to an indexing module. Additionally, input from a voice site 202 is provided to an audio content module 208, which then provides input to a mapping module 210, which includes mappings with landing info. The input from the voice site is parsed at each block level and each block as two values—one is the landing information and the other is the audio content. These are respectively parsed by modules 208 and 210 as well as in parallel by modules 204 and 206, and this combined information is then passed to the final index database 212. Further, input from both the indexing module 206 and the mapping module 210 is provided to the index database 212.

The indexed database 212 therefore includes the landing information for any item that has been indexed from the voice site in question. This ensures that, eventually, when any content result is matched with the query, the indexed database 212 will be able to provide the landing information along with the content that was matched.

Figure 3:
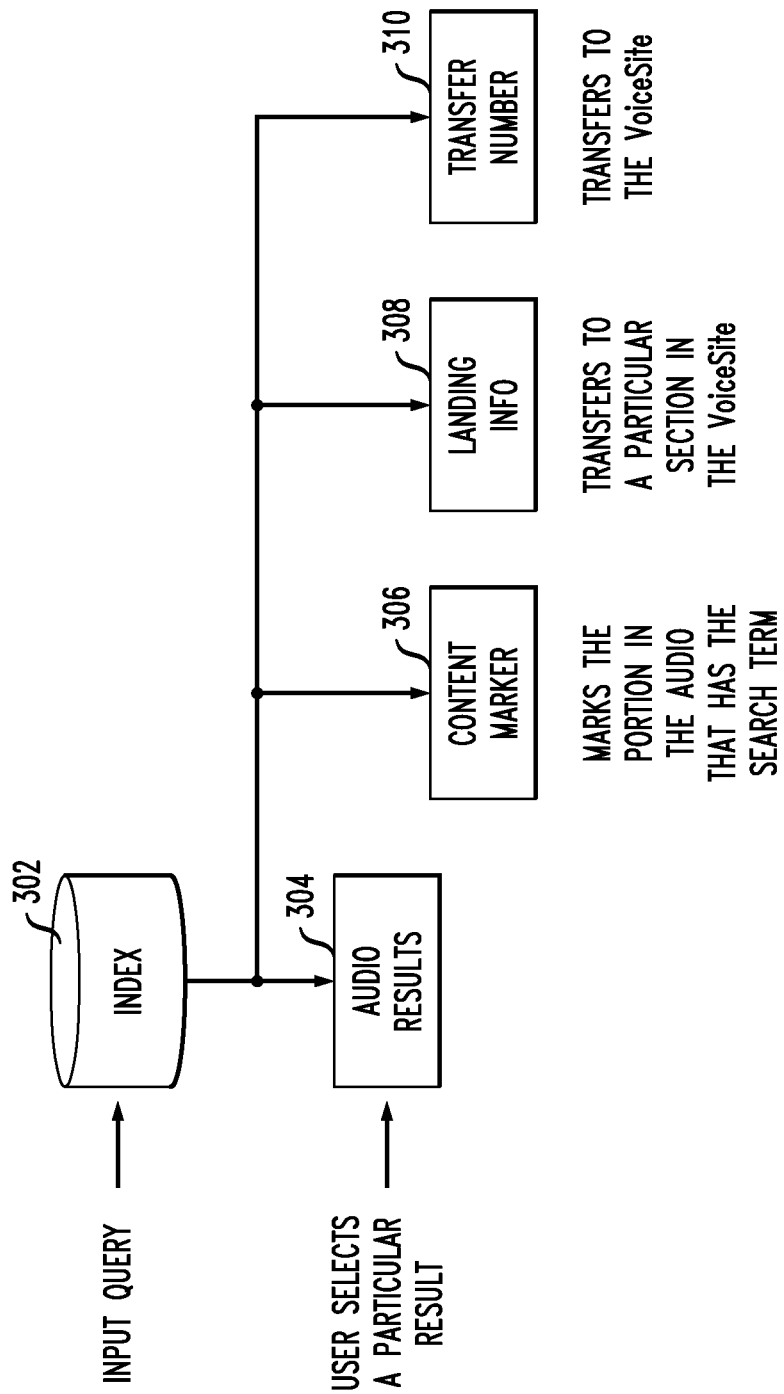
FIG. 3 is a diagram illustrating presentation, according to an aspect of the invention.

FIG. 3 is a diagram illustrating presentation, according to an aspect of the invention. By way of illustration, FIG. 3 depicts an input query submitted to an index database 302, which produces audio results 304, from which a particular result is selected by a user. FIG. 3 also depicts a content marker module 306 that marks the portion of the audio that contains the search term, landing information module 308 which transfers to a particular section/location in the voice site, and a transfer module 310 that transfers to the voice site.

Therefore, for every query, the system not only extracts the results 304, but also modifies the results through module 306 so that a user can be provided an exact location in the audio where the query exists. Along with the results, the system also extracts the landing info for this particular result through the landing information module 308. This ensures that not only are the results played to the user, but also the location of the query is highlighted and a transfer to the specific portion of the audio is carried out.

As noted above, an aspect of the invention includes the use of landing information and audio content marking. Landing information is present in each section/location of a voice site that stores the various session variables and audio prompts, in case the user lands directly at this portion of the site. The landing information can be specified in XML and can contain fields such as the name of the landing information, the variables and their values that are needed for transferring application to the specific position in the voice site. With respect to audio content marking, each audio file is mapped to a landing-name in the index, and when a search result is selected by a user, in response to a query, the query keywords are marked in the audio of the voice site. The marking can include actions such as appending a signature music, increasing the energy in audio, etc.

Figure 4:
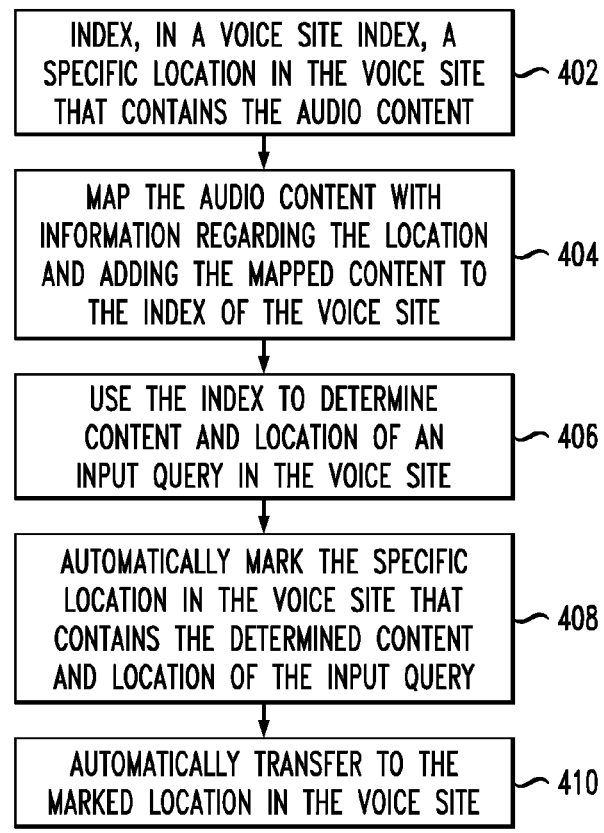
FIG. 4 is a flow diagram illustrating techniques for accessing a specific location in voice site audio content, according to an embodiment of the invention.

FIG. 4 is a flow diagram illustrating techniques for accessing a specific location in voice site audio content, according to an embodiment of the present invention. Step 402 includes indexing, in a voice site index, a specific location in the voice site that contains the audio content. This step can be carried out, for example, using an index module. The input query can be generated, for example, from a query-search interface.

Step 404 includes mapping the audio content with information regarding the location and adding the mapped content to the index of the voice site. This step can be carried out, for example, using a mapping module. Step 406 includes using the index to determine content and location of an input query in the voice site. This step can be carried out, for example, using an index module.

Step 408 includes automatically marking the specific location in the voice site that contains the determined content and location of the input query. This step can be carried out, for example, using a content marker module. Automatically marking the specific location in the voice site that contains the determined content and location of the input query includes mapping each audio file in the voice site to a landing information item in an index. Additionally, an aspect of the invention includes marking at least one query keyword in an audio file in the voice site in response to a search result being selected by a user. As detailed herein, marking of this piece in the audio file can be performed either by adding music to the background of that particular piece or by increasing its volume, or by appending music before and/or after the piece. Further, automatically marking the specific location in the voice site can include appending a signature music to the specific location in the voice site, increasing energy in audio at the specific location of the voice site, etc.

Step 410 includes automatically transferring (for example, transferring a telephone call) to the marked location in the voice site. This step can be carried out, for example, using a transfer module.

The techniques depicted in FIG. 4 additionally include dynamically playing audio from the marked location in the voice site. Also, as detailed herein, an aspect of the invention includes indexing at least one voice site.

The techniques depicted in FIG. 4 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules include a landing information module, an indexing module, a content marker module, a mapping module and a transfer module that can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 5:
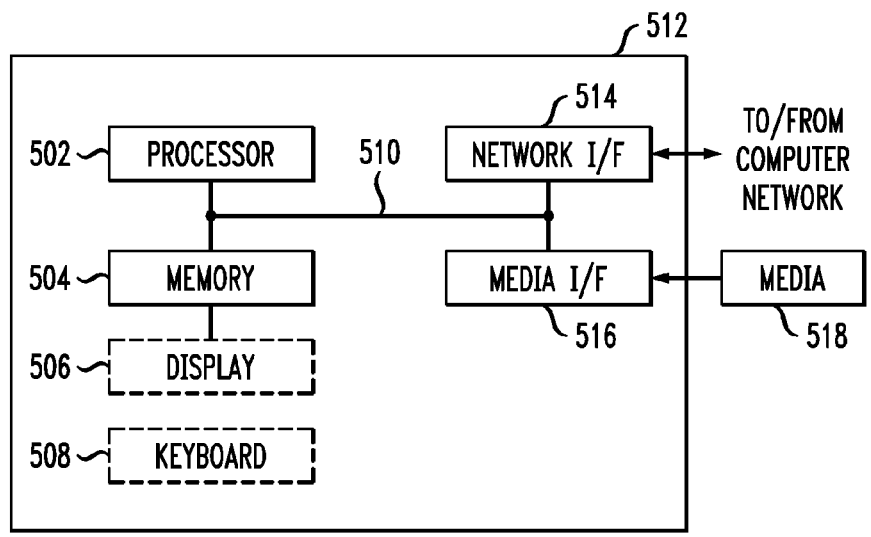
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening 110 controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, providing improvements in usability of a query-search interface for transferring to voice sites.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for accessing a specific location in voice site audio content, wherein the method comprises:
   indexing, in a voice site index, the specific location in the voice site that contains the audio content;
   mapping the audio content with a landing information item, wherein the landing information item comprises one or more fields describing the specific location of a respective file of the audio content in the voice site;
   adding the mapped content to the index of the voice site;
   using the index to determine content and location of an input query in the voice site;
   automatically marking the specific location in the voice site that contains the determined content and location of the input query, wherein said marking comprises (i) matching at least one portion of audio content from the input query to at least one file of audio content in the index, (ii) mapping the at least one portion of audio content from the input query to the landing information item in the index that corresponds to the at least one file of audio content in the index matching the at least one portion of audio content from the input query, wherein the landing information item describes the specific location in the voice site of the at least one file of audio content in the index matching the at least one portion of audio content from the input query, and (iii) marking at least one query keyword in a file of audio content in the voice site in response to at least one keyword derived via a search result selected by a user; and automatically transferring to the marked location in the voice site based on one or more items of landing information associated with the marked location in the voice site;

wherein at least one of the steps is carried out by a computer device.

2. The method of claim 1, further comprising dynamically playing audio from the marked location in the voice site.

3. The method of claim 1, wherein the input query is generated from a query-search interface.

4. The method of claim 1, wherein automatically transferring to the marked location in the voice site comprises automatically transferring a telephone call to the marked location in the voice site.

5. The method of claim 1, wherein automatically marking the specific location in the voice site that contains the determined content and location of the input query comprises appending a signature music before the specific location in the voice site.

6. The method of claim 1, wherein automatically marking the specific location in the voice site that contains the determined content and location of the input query comprises appending a signature music after the specific location in the voice site.

7. The method of claim 1, wherein automatically marking the specific location in the voice site that contains the determined content and location of the input query comprises increasing energy in audio at the specific location of the voice site.

8. The method of claim 1, further comprising:
providing a system, wherein the system comprises at least one distinct software module, each distinct software module being embodied on a tangible computer-readable recordable storage medium, and wherein the at least one distinct software module comprises a landing information module, an indexing module, a content marker module, a mapping module and a transfer module executing on a hardware processor.

9. An article of manufacture comprising a non-transitory computer readable storage device having computer readable instructions tangibly embodied thereon which, when implemented, cause a computer to carry out a plurality of method steps comprising:
indexing, in a voice site index, the specific location in the voice site that contains the audio content;
mapping the audio content with a landing information item, wherein the landing information item comprises one or more fields describing the specific location of a respective file of the audio content in the voice site;
adding the mapped content to the index of the voice site;
using the index to determine content and location of an input query in the voice site;
automatically marking the specific location in the voice site that contains the determined content and location of the input query, wherein said marking comprises (i) matching at least one portion of audio content from the input query to at least one file of audio content in the index, (ii) mapping the at least one portion of audio content from the input query to the landing information item in the index that corresponds to the at least one file of audio content in the index matching the at least one portion of audio content from the input query, wherein the landing information item describes the specific location in the voice site of the at least one file of audio content in the index matching the at least one portion of audio content from the input query, and (iii) marking at least one query keyword in a file of audio content in the voice site in response to at least one keyword derived via a search result selected by a user; and automatically transferring to the marked location in the voice site based on one or more items of landing information associated with the marked location in the voice site.

10. The article of manufacture of claim 9, wherein the computer readable instructions which, when implemented, further cause a computer to carry out a method step comprising:
dynamically playing audio from the marked location in the voice site.

11. The article of manufacture of claim 9, wherein automatically marking the specific location in the voice site that contains the determined content and location of the input query comprises one of appending a signature music before the specific location in the voice site and appending a signature music after the specific location in the voice site.

12. The article of manufacture of claim 9, wherein automatically marking the specific location in the voice site that contains the determined content and location of the input query comprises increasing energy in audio at the specific location of the voice site.

13. A system for accessing a specific location in voice site audio content, comprising:
at least one distinct software module, each distinct software module being embodied on a tangible computer-readable medium;
a memory; and
at least one processor coupled to the memory and operative for:
indexing, in a voice site index, the specific location in the voice site that contains the audio content;
mapping the audio content with a landing information item, wherein the landing information item comprises one or more fields describing the specific location of a respective file of the audio content in the voice site;
adding the mapped content to the index of the voice site;
using the index to determine content and location of an input query in the voice site;
automatically marking the specific location in the voice site that contains the determined content and location of the input query, wherein said marking comprises (i) matching at least one portion of audio content from the input query to at least one file of audio content in the index, (ii) mapping the at least one portion of audio content from the input query to the landing information item in the index that corresponds to the at least one file of audio content in the index matching the at least one portion of audio content from the input query, wherein the landing information item describes the specific location in the voice site of the at least one file of audio content in the index matching the at least one portion of audio content from the input query, and (iii) marking at least one query keyword in a file of audio content in the voice site in response to at least one keyword derived via a search result selected by a user; and automatically transferring to the marked location in the voice site based on one or more items of landing information associated with the marked location in the voice site.

14. The system of claim 13, wherein the at least one processor coupled to the memory is further operative for:
dynamically playing audio from the marked location in the voice site.

15. The system of claim 13, wherein the at least one processor coupled to the memory operative for automatically marking the specific location in the voice site that contains the determined content and location of the input query is further operative for one of appending a signature music before the specific location in the voice site and appending a signature music after the specific location in the voice site.

16. The system of claim 13, wherein the at least one processor coupled to the memory operative for automatically marking the specific location in the voice site that contains the determined content and location of the input query is further operative for increasing energy in audio at the specific location of the voice site.

\* \* \* \* \*